(12) United States Patent
Jia et al.

(10) Patent No.: US 9,730,151 B2
(45) Date of Patent: Aug. 8, 2017

(54) METHOD AND APPARATUS FOR INITIATING CHANNEL SOUNDING WITH UNASSOCIATED ACCESS POINTS

(71) Applicant: QUALCOMM Incorporated, San Diego, CA (US)

(72) Inventors: Zhanfeng Jia, Belmont, CA (US); Ning Zhang, Saratoga, CA (US); David Kuochieh Su, Saratoga, CA (US); Xuetao Chen, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 202 days.

(21) Appl. No.: 14/695,613

(22) Filed: Apr. 24, 2015

(65) Prior Publication Data

US 2016/0316424 A1    Oct. 27, 2016

(51) Int. Cl.
| | | |
|---|---|---|
| *H04W 48/18* | (2009.01) | |
| *H04W 48/16* | (2009.01) | |
| *H04L 1/16* | (2006.01) | |
| *H04W 72/04* | (2009.01) | |
| *H04W 48/20* | (2009.01) | |

(52) U.S. Cl.
CPC .......... *H04W 48/18* (2013.01); *H04L 1/1607* (2013.01); *H04W 48/16* (2013.01); *H04W 72/0406* (2013.01); *H04W 48/20* (2013.01)

(58) Field of Classification Search
CPC . H04W 48/18; H04W 48/16; H04W 72/0406; H04L 1/1607
See application file for complete search history.

(56) References Cited

U.S. PATENT DOCUMENTS

| | | | |
|---|---|---|---|
| 6,031,831 A | 2/2000 | Tan Boon et al. | |
| 8,498,362 B2 | 7/2013 | Zhang et al. | |
| 2012/0051351 A1* | 3/2012 | Lee ...................... | H04W 48/20 370/338 |
| 2012/0128090 A1* | 5/2012 | Seok ..................... | H04W 48/20 375/267 |
| 2013/0223427 A1 | 8/2013 | Sohn et al. | |
| 2014/0056205 A1* | 2/2014 | Aboul-Magd .... | H04W 72/0426 370/312 |
| 2014/0086200 A1 | 3/2014 | Seok | |

(Continued)

FOREIGN PATENT DOCUMENTS

EP       2741431 A2     6/2014

OTHER PUBLICATIONS

International Search Report and Written Opinion—PCT/US2016/023841—ISA/EPO—Jul. 6, 2016.

*Primary Examiner* — Chi H Pham
*Assistant Examiner* — Weibin Huang
(74) *Attorney, Agent, or Firm* — Paradice and Li LLP/Qualcomm

(57) ABSTRACT

A system and method are disclosed that may allow a STA to request one or more non-associated APs to initiate channel sounding operations with the STA. In response to the request, a number of the non-associated APs may send one or more NDPs to the STA. The STA may use the received NDPs to determine a goodput value for each of the number of non-associated APs. The STA may then use the determined goodput values to select one of the number of non-associated APs with which to associate. Thereafter, the STA may initiate an association operation with the selected AP.

27 Claims, 11 Drawing Sheets

(56) References Cited

U.S. PATENT DOCUMENTS

| | | |
|---|---|---|
| 2014/0204827 A1 | 7/2014 | Grandhi et al. |
| 2014/0247746 A1 | 9/2014 | You et al. |
| 2014/0369435 A1* | 12/2014 | Kneckt ............... H04B 7/0413 375/267 |
| 2016/0278081 A1* | 9/2016 | Chun .................... H04W 74/08 |

* cited by examiner

METHOD AND APPARATUS FOR INITIATING CHANNEL SOUNDING WITH UNASSOCIATED ACCESS POINTS

TECHNICAL FIELD

The example embodiments relate generally to wireless networks, and specifically to selecting an access point with which a mobile station is to associate.

BACKGROUND OF RELATED ART

A wireless local area network (WLAN) may be formed by one or more access points (APs) that provide a shared wireless communication medium for use by a number of client devices or stations (STAs). Each AP, which may correspond to a Basic Service Set (BSS), periodically broadcasts beacon frames to enable any STAs within wireless range of the AP to establish and/or maintain a communication link with the WLAN. In a typical WLAN, only one STA may use the wireless medium at any given time, and each STA may be associated with only one AP at a time. Due to the increasing ubiquity of wireless networks, when a STA seeks to join a wireless network, the STA may have a choice between multiple wireless networks and/or between multiple APs that form an extended BSS. Further, many home wireless networks employ a root AP (e.g., a base station) and multiple relay devices (e.g., "repeaters") to extend the effective wireless coverage area of the root AP. As the STA is moved into the coverage area of one or more wireless networks, the STA may select the best AP with which to associate. After the STA becomes associated with the selected AP, the STA may be moved within and/or between the coverage area of the one or more wireless networks, and may subsequently benefit from switching its association from the selected AP to one of a number of candidate APs (e.g., APs with which the STA is not associated).

Accordingly, it is desirable for the STA to be able to quickly determine the best available AP with which to associate, regardless of whether the STA is associated with the available APs.

BRIEF DESCRIPTION OF THE DRAWINGS

The example embodiments are illustrated by way of example and are not intended to be limited by the figures of the accompanying drawings.

Like reference numerals refer to corresponding parts throughout the drawing figures.

DETAILED DESCRIPTION

Figure 1A:
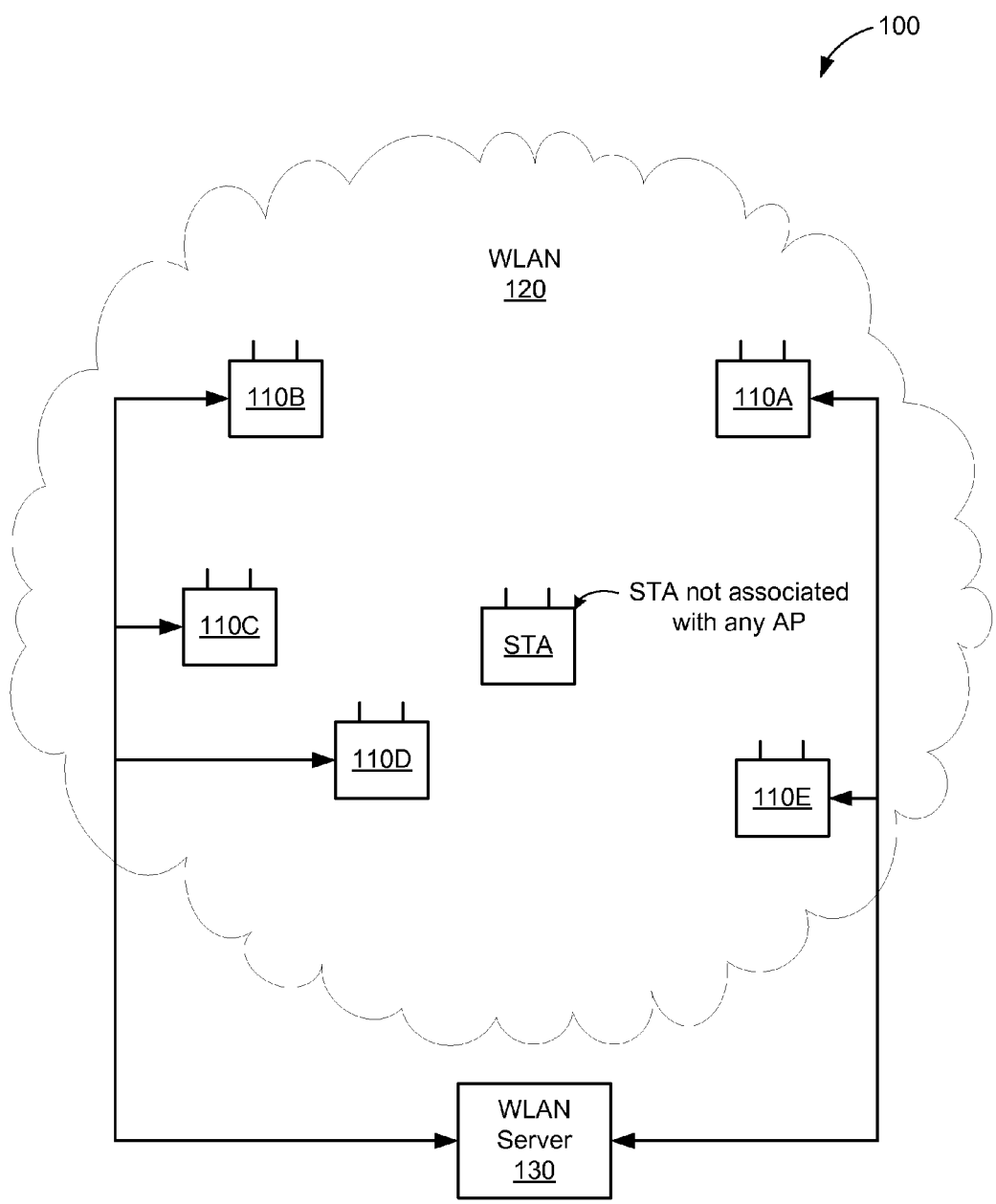
FIG. 1A shows a block diagram of a wireless system within which the example embodiments may be implemented.

The example embodiments are described below in the context of WLAN systems for simplicity only. It is to be understood that the example embodiments are equally applicable to other wireless networks (e.g., cellular networks, pico networks, femto networks, satellite networks), as well as for systems using signals of one or more wired standards or protocols (e.g., Ethernet and/or HomePlug/PLC standards). As used herein, the terms "WLAN" and "Wi-Fi®" may include communications governed by the IEEE 802.11 family of standards, Bluetooth, HiperLAN (a set of wireless standards, comparable to the IEEE 802.11 standards, used primarily in Europe), and other technologies having relatively short radio propagation range. Thus, the terms "WLAN" and "Wi-Fi" may be used interchangeably herein. In addition, although described below in terms of an infrastructure WLAN system including one or more APs and a number of STAs, the example embodiments are equally applicable to other WLAN systems including, for example, multiple WLANs, peer-to-peer (or Independent Basic Service Set) systems, Wi-Fi Direct systems, and/or Hotspots. In addition, although described herein in terms of exchanging data frames between wireless devices, the example embodiments may be applied to the exchange of any data unit, packet, and/or frame between wireless devices. Thus, the term "frame" may include any frame, packet, or data unit such as, for example, protocol data units (PDUs), MAC protocol data units (MPDUs), and physical layer convergence procedure protocol data units (PPDUs). The term "A-MPDU" may refer to aggregated MPDUs.

In the following description, numerous specific details are set forth such as examples of specific components, circuits, and processes to provide a thorough understanding of the present disclosure. The term "coupled" as used herein means connected directly to or connected through one or more intervening components or circuits. The term "associated AP" refers to an AP with which a given STA is associated (e.g., there is an established communication channel or link between the AP and the given STA). The term "non-associated AP" refers to an AP with which a given STA is not associated (e.g., there is not an established communication channel or link between the AP and the given STA, and thus the AP and the given STA may not yet exchange data frames). The term "associated STA" refers to a STA that is associated with a given AP, and the term "non-associated STA" refers to a STA that is not associated with the given AP.

Further, the term "goodput" may refer to an effective data rate of a wireless channel or link between two wireless devices (e.g., between a STA and an AP). For example embodiments, the goodput value of an AP may be indicative of the available bandwidth or medium share of a wireless channel upon which the AP operates. The term "sounding packet" may refer to a frame or packet that includes a predetermined pattern of information (e.g., a training sequence) that is known to a receiving device and that may be used as a basis for estimating channel conditions and/or goodput values of APs. For example, a null data packet (NDP), which does not contain data, may be used as a sounding packet. Thus, the term "NDP" may be used interchangeably with the term "sounding packet."

Also, in the following description and for purposes of explanation, specific nomenclature is set forth to provide a thorough understanding of the example embodiments. However, it will be apparent to one skilled in the art that these specific details may not be required to practice the example embodiments. In other instances, well-known circuits and devices are shown in block diagram form to avoid obscuring the present disclosure. The example embodiments are not to be construed as limited to specific examples described herein but rather to include within their scopes all embodiments defined by the appended claims.

As mentioned above, when a wireless device such as a STA is moved into the coverage area of a wireless network, it may be desirable for the STA to select the best available AP with which to associate. As used herein, the term "best available AP" may refer to the AP that provides the highest goodput (e.g., as compared with the goodput of other nearby candidate APs). In addition, after the STA becomes associated with a particular AP, it may be desirable for the STA to continually (e.g., periodically) scan the surrounding environment to determine whether one or more other (e.g., non-associated) APs may offer the STA better goodput than the AP with which the STA is currently associated.

There are numerous techniques for estimating an AP's throughput. For example, a STA may use received signal strength indicator (RSSI) values as an indication of an AP's throughput. However, because RSSI values may not account for channel conditions, multiple-input multiple-output (MIMO) gain, and other traffic on the wireless medium, RSSI values may not provide an accurate indication of the AP's available throughput.

The STA may directly measure the goodput of an AP by exchanging a number of data frames with the AP, and then measuring the effective data rate of the frames received from the AP. However, exchanging data frames with an AP may require the STA to be associated with the AP. For example, according to current IEEE 802.11 protocols, when an AP is to transmit data frames to a STA, the AP embeds an association identification (AID) value into the preamble of the data frames so that the STA identified by the AID value knows that it is the intended recipient of the transmitted data frames. Because the AP assigns AID values to STAs during association operations, STAs that are not associated with the AP do not have AP-assigned AID values, and therefore may not be able to receive the data frames. As a result, a STA may not be able to directly measure the goodput of non-associated APs using data frame exchanges.

Applicant has discovered that channel sounding operations may be leveraged to measure the goodput of an AP. Channel sounding operations are typically used by wireless devices employing transmit beamforming technology to improve the coherence with which multiple data streams may be combined at a receiving device. For example, in accordance with the IEEE 802.11n standards, sounding packets may be transmitted by an AP to a STA. The sounding packets contain training symbols (e.g., a training sequence) that, upon receipt by the STA, may be interpreted to characterize the channel. Based on the calculated channel characteristics, a beamforming matrix or vector may be applied by the AP to weight and combine raw data signals. Then, using the beamforming matrix, multiple data streams may be encoded by the AP in a manner that allows the multiple data streams to be coherently combined at the STA (e.g., even in the presence of scattering and multipath effects).

Current IEEE 802.11 standards may not allow an AP to initiate channel sounding operations with STAs that are not associated with the AP. For example, to initiate a channel sounding operation with a STA, the AP may first send a Null Data Packet Announcement (NDPA) frame to the STA. The NDPA, which includes an AID value assigned by the AP to the STA, may announce that the AP is to send one or more NDPs to the STA identified by the AID value. The NDPA may also request the STA identified by the AID value to provide channel state information (CSI) in a feedback frame to the AP. As discussed above, the AP assigns AID values to STAs during association operations. Thus, STAs that are not associated with an AP do not have AP-assigned AID values, and therefore cannot be identified by the AP as a target of channel sounding operations using conventional NDPAs.

Accordingly, when a STA is selecting one of a number of non-associated APs with which to associate, it would be desirable for the STA to be able to utilize AP-initiated channel sounding operations to determine goodput values for the non-associated APs, for example, as a basis for selecting one of the non-associated APs with which to associate. This is at least one of the technical problems to be solved by the example embodiments.

In accordance with example embodiments, a method and apparatus are disclosed that may allow a STA to request one or more non-associated APs to initiate channel sounding operations with the STA prior to association (e.g., without having an AID value assigned to the STA by any of the non-associated APs requested to initiate the channel sounding operations). More specifically, for at least one example embodiment, the STA may broadcast a probe request that includes a request for one or more non-associated APs to initiate a channel sounding operation with the STA. The non-associated APs may be configured to decode the AP-initiated channel sounding request sent by the STA. In response thereto, the non-associated APs may send one or more NDPs to the STA. The STA may receive one or more NDPs from each of a number of the non-associated APs, and use the received NDPs to determine a goodput value for each of the number of non-associated APs. The STA may then use the determined goodput values to select one of the number of non-associated APs (e.g., having the best or greatest goodput value) with which to associate. Thereafter, the STA may initiate an association operation with the selected AP. These and other details of the example embodiments, which provide one or more technical solutions to the aforementioned technical problem, are described in more detail below.

FIG. 1A shows a block diagram of an example wireless system 100 within which the example embodiments may be implemented. The wireless system 100 is shown to include a wireless station STA, a number of wireless access points (APs) 110A-110E, and a wireless local area network (WLAN) 120. The WLAN 120 may be formed by any number of APs that may operate according to the IEEE 802.11 family of standards (or according to other suitable wireless protocols). Thus, although only five APs 110A-110E are shown in FIG. 1A for simplicity, it is to be understood that WLAN 120 may be formed by any number of APs. Each of APs 110A-110E is assigned a unique MAC address that is programmed therein by, for example, the manufacturer of the AP. Similarly, the STA is also assigned a unique MAC address. For some embodiments, the wireless system 100 may correspond to a multi-user multiple-input multiple-output (MU-MIMO) wireless network (e.g., as defined by the IEEE 802.11ac specification). Further, although the WLAN 120 is depicted in FIG. 1A as an infrastructure BSS, for other example embodiments, WLAN 120 may be an IBSS, an ad-hoc network, or a peer-to-peer (P2P) network (e.g., operating according to the Wi-Fi Direct protocols).

The station STA may be any suitable Wi-Fi enabled wireless device including, for example, a cell phone, personal digital assistant (PDA), tablet device, laptop computer, or the like. The station STA may also be referred to as a user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. For at least some embodiments, the station STA may include one or more transceivers, one or more processing resources (e.g., processors and/or ASICs), one or more memory resources, and a power source (e.g., a battery). The memory resources may include a non-transitory computer-readable medium (e.g., one or more nonvolatile memory elements, such as EPROM, EEPROM, Flash memory, a hard drive, etc.) that stores instructions for performing operations described below with respect to FIGS. 4A-4C, 5, and 7.

The one or more transceivers may include Wi-Fi transceivers, Bluetooth transceivers, cellular transceivers, and/or other suitable radio frequency (RF) transceivers (not shown for simplicity) to transmit and receive wireless communication signals. Each transceiver may communicate with other wireless devices in distinct operating frequency bands and/or using distinct communication protocols. For example, the Wi-Fi transceiver may communicate within a 2.4 GHz frequency band and/or within a 5 GHz frequency band in accordance with the IEEE 802.11 specification. The cellular transceiver may communicate within various RF frequency bands in accordance with a 4G Long Term Evolution (LTE) protocol described by the 3rd Generation Partnership Project (3GPP) (e.g., between approximately 700 MHz and approximately 3.9 GHz) and/or in accordance with other cellular protocols (e.g., a Global System for Mobile (GSM) communications protocol). In other embodiments, the transceivers included within the STA may be any technically feasible transceiver such as a ZigBee transceiver described by a specification from the ZigBee specification, a WiGig transceiver, and/or a HomePlug transceiver described a specification from the HomePlug Alliance.

The APs 110A-110E may be any suitable device that allows one or more wireless devices to connect to a network (e.g., a local area network (LAN), wide area network (WAN), metropolitan area network (MAN), and/or the Internet) using Wi-Fi, Bluetooth, or any other suitable wireless communication standards. For at least one embodiment, each of APs 110A-110E may include one or more transceivers, a network interface, one or more processing resources, and one or more memory resources. The memory resources may include a non-transitory computer-readable medium (e.g., one or more nonvolatile memory elements, such as EPROM, EEPROM, Flash memory, a hard drive, etc.) that store instructions for performing operations described below with respect to FIGS. 4A-4C, 5, and 7.

For the example wireless system 100, the APs 110A-110E are shown as connected to a WLAN server 130. The WLAN server 130 may coordinate activities (e.g., load balancing operations) of the APs 110A-110E, and may provide a backhaul connection to one or more other networks (e.g., the Internet). For other embodiments, the WLAN server 130 may be omitted.

As depicted in FIG. 1A, the STA is not associated with any of the APs 110A-110E, and therefore the STA does not have an established communication link with any of the APs 110A-110E. As a result, the STA may seek to join WLAN 120 and/or associate with one of the non-associated APs 110A-110E. Thus, it is desirable for the STA of FIG. 1A to be able to measure the goodput of the non-associated APs 110A-110E when selecting with which of the non-associated APs 110B-110E to associate.

Figure 1B:
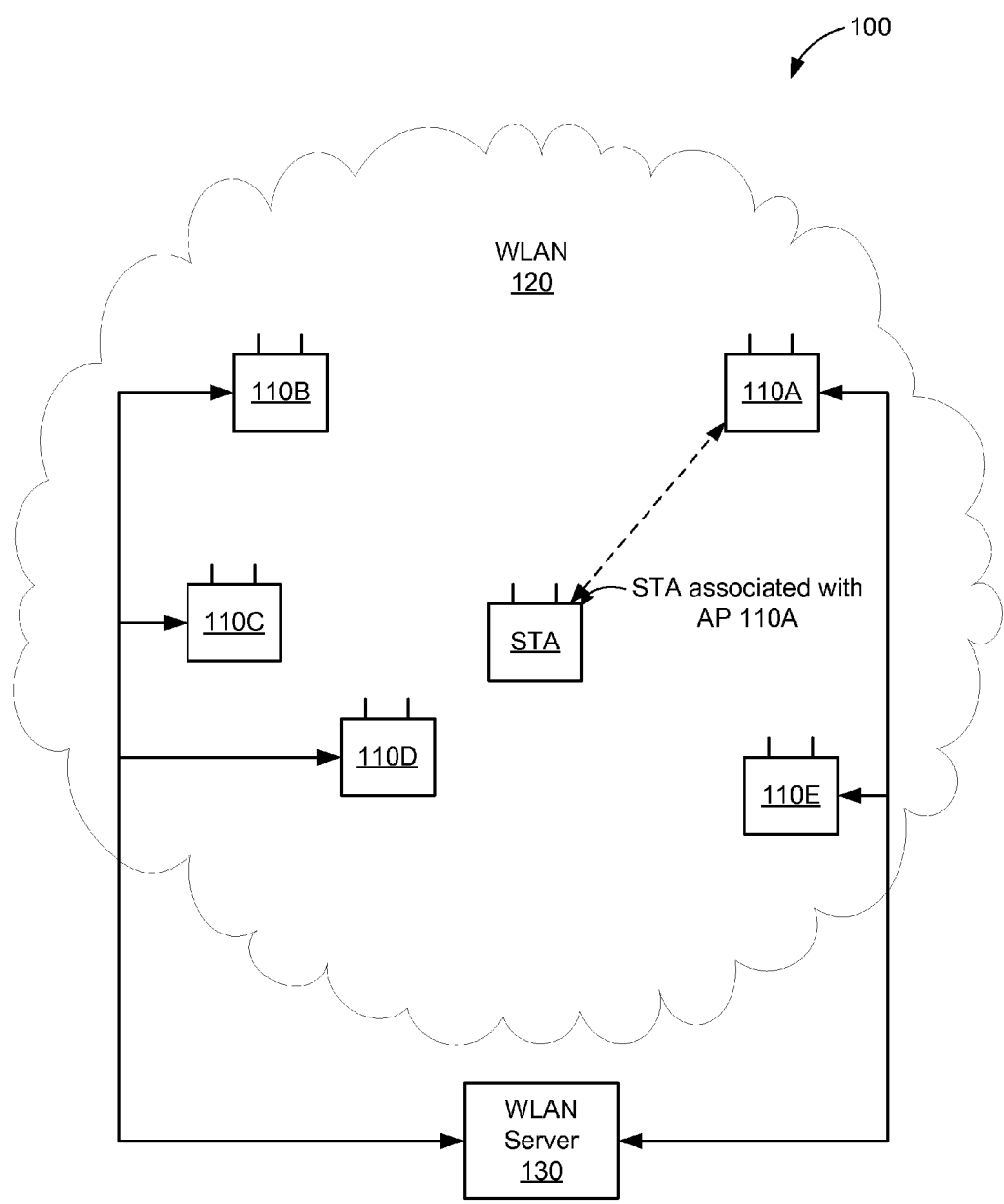
FIG. 1B shows a block diagram of the wireless system of FIG. 1A depicting a station associated with one of the access points.

It is to be noted without loss of generality that the example embodiments may be applied to a scenario in which the STA is associated with one of the APs 110A-110E but may seek to switch its association to another one of the APs 110A-110E (e.g., because the STA has moved positions, because of changing channel conditions, reduced goodput of the associated AP, and so on). For example, FIG. 1B depicts system 100 when the STA is associated with AP 110A and is still within wireless range of the non-associated APs 110B-110E. Thus, although the STA is still within wireless range of the associated AP 110A, one or more of the non-associated APs 110B-110E may offer better performance (e.g., higher throughput) than AP 110A. Thus, it is desirable for the STA of FIG. 1B to be able to measure the goodput of the non-associated APs 110B-110E when determining whether to switch its association from AP 110A to one of the non-associated APs 110B-110E.

Figure 2:
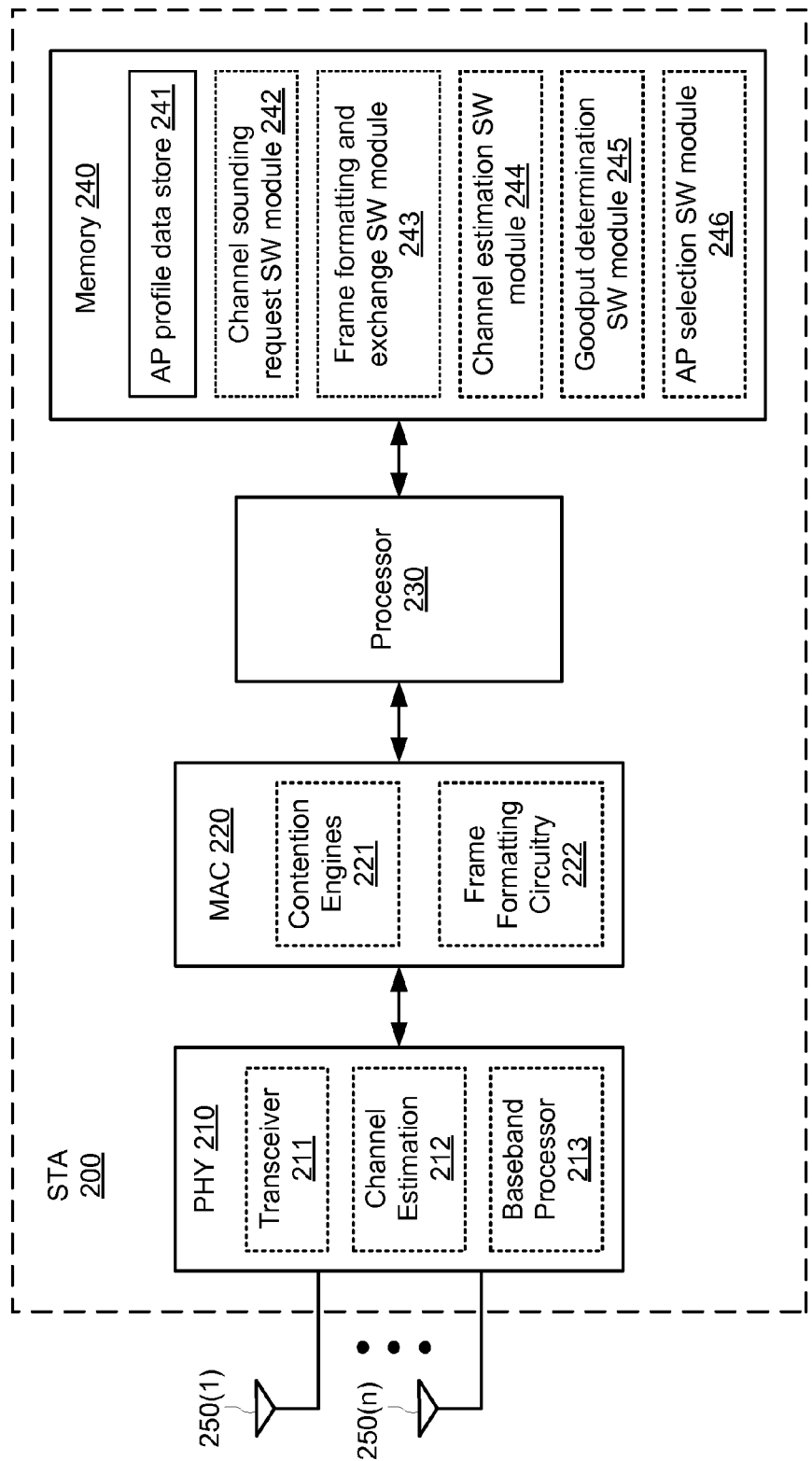
FIG. 2 shows a block diagram of a wireless station (STA) in accordance with example embodiments.

FIG. 2 shows an example STA 200 that may be one embodiment of the station STA of FIGS. 1A-1B. The STA 200 may include a PHY device 210 including at least a transceiver 211, a channel estimation module 212, and a baseband processor 213, may include a MAC 220 including at least a number of contention engines 221 and frame formatting circuitry 222, may include a processor 230, may include a memory 240, and may include a number of antennas $250(1)$-$250(n)$. The transceiver 211 may be coupled to antennas $250(1)$-$250(n)$, either directly or through an antenna selection circuit (not shown for simplicity). The transceiver 211 may be used to transmit signals to and receive signals from APs 110A-110E and/or other STAs (see also FIGS. 1A-1B), and may be used to scan the surrounding environment to detect and identify nearby access points and/or other STAs (e.g., within wireless range of STA 200). Although not shown in FIG. 2 for simplicity, the transceiver 211 may include any number of transmit chains to process and transmit signals to other wireless devices via antennas $250(1)$-$250(n)$, and may include any number of receive chains to process signals received from antennas $250(1)$-$250(n)$. Thus, for example embodiments, the STA 200 may be configured for multiple-input, multiple-output (MIMO) operations. The MIMO operations may include single-user MIMO (SU-MIMO) operations and multi-user MIMO (MU-MIMO) operations.

The channel estimation module 212 may be used to estimate channel conditions and/or to determine channel state information (CSI) based on channel sounding operations (e.g., as described for one or more operations of FIGS. 4A-4C, 5, and 7). For some implementations, the channel estimation module 212 may be responsible, at least in part, for providing feedback (e.g., CSI information) to one or more APs.

The baseband processor 213 may be used to process signals received from processor 230 and/or memory 240 and to forward the processed signals to transceiver 211 for transmission via one or more of antennas $250(1)$-$250(n)$, and may be used to process signals received from one or more of antennas 250(1)-250(n) via transceiver 211 and to forward the processed signals to processor 230 and/or memory 240.

For purposes of discussion herein, MAC 220 is shown in FIG. 2 as being coupled between PHY device 210 and processor 230. For actual embodiments, PHY device 210, MAC 220, processor 230, and/or memory 240 may be connected together using one or more buses (not shown for simplicity).

The contention engines 221 may contend for access to one or more shared wireless mediums, and may also store packets for transmission over the one more shared wireless mediums. The STA 200 may include one or more contention engines 221 for each of a plurality of different access categories. For other embodiments, the contention engines 221 may be separate from MAC 220. For still other embodiments, the contention engines 221 may be implemented as one or more software modules (e.g., stored in memory 240 or stored in memory provided within MAC 220) containing instructions that, when executed by processor 230, perform the functions of contention engines 221.

The frame formatting circuitry 222 may be used to create and/or format frames received from processor 230 and/or memory 240 (e.g., by adding MAC headers to PDUs provided by processor 230), and may be used to re-format frames received from PHY device 210 (e.g., by stripping MAC headers from frames received from PHY device 210).

Memory 240 may include an AP profile data store 241 that stores profile information for a plurality of APs. The profile information for a particular AP may include information including, for example, the AP's service set identifier (SSID), MAC address, channel information, RSSI values, goodput values, channel state information (CSI), supported data rates, connection history with STA 200, a trustworthiness value of the AP (e.g., indicating a level of confidence about the AP's location, etc.), and any other suitable information pertaining to or describing the operation of the AP.

Memory 240 may also include a non-transitory computer-readable medium (e.g., one or more nonvolatile memory elements, such as EPROM, EEPROM, Flash memory, a hard drive, and so on) that may store at least the following software (SW) modules:

- a channel sounding request software module 242 for creating a request for one or more non-associated APs to initiate channel sounding operations with STA 200 (e.g., as described for one or more operations of FIGS. 4A-4C, 5, and 7);
- a frame formatting and exchange software module 243 for creating probe request frames embedded with AP-initiated channel sounding requests and for facilitating the creation and exchange of frames (e.g., probe requests, data frames, acknowledgement (ACK) frames, management frames, action frames, control frames, feedback frames (e.g., CBF frames), association requests, and so on) between STA 200 and other wireless devices (e.g., as described for one or more operations of FIGS. 4A-4C, 5, and 7);
- a channel estimation software module 244 for estimating channel conditions and/or determining channel state information (CSI) for each of a number of non-associated APs based, at least in part, on the requested AP-initiated channel sounding operations (e.g., as described for one or more operations of FIGS. 4A-4C, 5, and 7);
- a goodput determination software module 245 for determining goodput values for each of the number of non-associated APs based, at least in part, on the requested AP-initiated channel sounding operations (e.g., as described for one or more operations of FIGS. 4A-4C, 5, and 7); and
- an AP selection software module 246 for selecting one of the number of non-associated APs with which STA 200 is to associate (or to switch its association) based, at least in part, on the determined goodput values (e.g., as described for one or more operations of FIGS. 4A-4C, 5, and 7).

Each software module includes instructions that, when executed by processor 230, cause STA 200 to perform the corresponding functions. The non-transitory computer-readable medium of memory 240 thus includes instructions for performing all or a portion of the STA-side operations depicted in FIGS. 4A-4C, 5, and 7.

Processor 230, which is shown in the example of FIG. 2 as coupled to PHY device 210, to MAC 220, and to memory 240, may be any suitable one or more processors capable of executing scripts or instructions of one or more software programs stored in STA 200 (e.g., within memory 240). For example, processor 230 may execute the channel sounding request software module 242 to create a request for one or more non-associated APs to initiate channel sounding operations with STA 200. As described in more detail below, the AP-initiated channel sounding request may cause a number of the non-associated APs to send NDPs to STA 200, for example, so that STA 200 may determine goodput values of the non-associated APs based, at least in part, on the received NDPs.

Processor 230 may execute the frame formatting and exchange software module 243 to create probe request frames embedded with AP-initiated channel sounding requests (e.g., created by the channel sounding request software module 242). Processor 230 may also execute the frame formatting and exchange software module 243 to facilitate the creation and exchange of any suitable frames between STA 200 and other wireless devices (e.g., associated APs, non-associated APs, and/or other STAs).

Processor 230 may execute the channel estimation software module 244 to estimate channel conditions and/or to determine channel state information (CSI) for each of a number of non-associated APs (as well as for associated APs). As described in more detail below, STA 200 may estimate channel conditions and/or determine the CSI for the non-associated APs based, at least in part, on NDPs received by STA 200 from the non-associated APs.

Processor 230 may execute the goodput determination software module 245 to determine goodput values (or other information indicative of the effective downlink (DL) data rates) for the non-associated APs based, at least in part, on NDPs received by STA 200 from the non-associated APs. For other embodiments, the goodput determination software module 245 may determine the goodput values based, at least in part, on the determined CSI.

Processor 230 may execute the AP selection software module 246 to select one of the non-associated APs with which to request association based, at least in part, on the determined goodput values of the non-associated APs. For one example, when STA 200 is not associated with any AP, the AP selection software module 246 may be executed to compare the goodput values of the non-associated APs with each other and to select the non-associated AP having the greatest goodput value for an association operation with STA 200. For another example, when STA 200 is currently associated with an AP and seeks to determine whether any other (e.g., non-associated APs) may offer better performance, the AP selection software module 246 may be executed to compare the goodput values of the non-associated APs and a goodput value of the associated AP with each other. If the goodput value of the associated AP is greater than the goodput values of the non-associated APs, then the STA may maintain its current AP association. Conversely, if the goodput value of the associated AP is not greater than all of the goodput values of the non-associated APs, then the STA may switch its association to the non-associated AP having the greatest goodput value.

Figure 3:
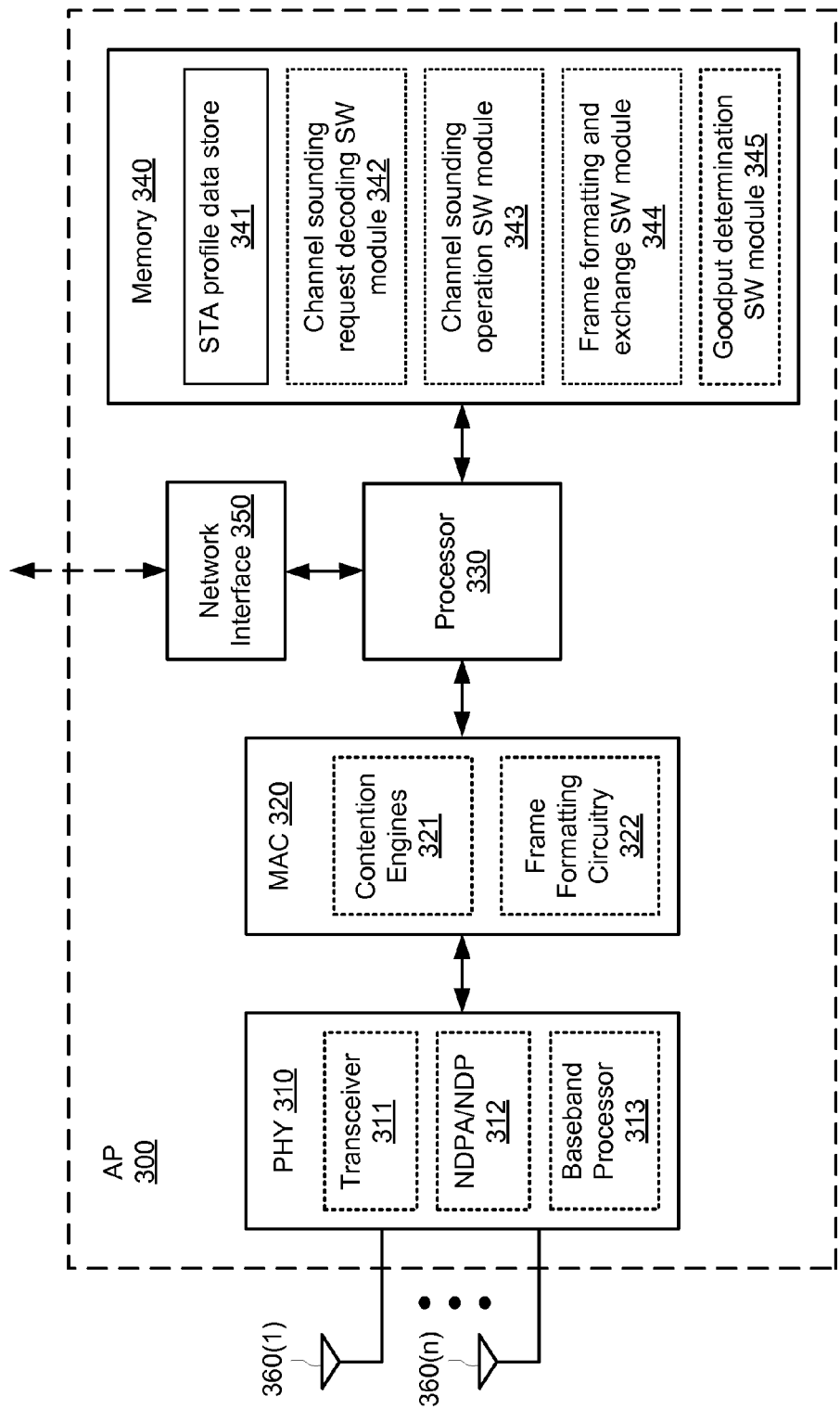
FIG. 3 shows a block diagram of an access point (AP) in accordance with example embodiments.

FIG. 3 shows an example AP 300 that may be one embodiment of one or more of the APs 110A-110E of FIGS. 1A-1B. AP 300 may include a PHY device 310 including at least a transceiver 311, an NDPA/NDP module 312, and a baseband processor 313, may include a MAC 320 including at least a number of contention engines 321 and frame formatting circuitry 322, may include a processor 330, may include a memory 340, may include a network interface 350, and may include a number of antennas 360(1)-360(n). The transceiver 311 may be coupled to antennas 360(1)-360(n), either directly or through an antenna selection circuit (not shown for simplicity). The transceiver 311 may be used to communicate wirelessly with one or more STAs, with one or more other APs, and/or with other suitable devices. Although not shown in FIG. 3 for simplicity, the transceiver 311 may include any number of transmit chains to process and transmit signals to other wireless devices via antennas 360(1)-360(n), and may include any number of receive chains to process signals received from antennas 360(1)-360(n). Thus, for example embodiments, the AP 300 may be configured for MIMO operations including, for example, SU-MIMO operations and MU-MIMO operations.

The NDPA/NDP module 312 may be used to transmit NDPAs and/or NDPs to one or more STA (e.g., in response to a request for an AP-initiated channel sounding operation). The NDPAs and/or NDPs may be transmitted to STAs in separate frames (e.g., as described below with respect to FIGS. 4A-4B) or may be transmitted to STAs in the same frame (e.g., as described below with respect to FIG. 4C).

The baseband processor 313 may be used to process signals received from processor 330 and/or memory 340 and to forward the processed signals to transceiver 311 for transmission via one or more of antennas 360(1)-360(n), and may be used to process signals received from one or more of antennas 360(1)-360(n) via transceiver 311 and to forward the processed signals to processor 330 and/or memory 340.

The network interface 350 may be used to communicate with WLAN server 130 of FIGS. 1A-1B either directly or via one or more intervening networks and to transmit signals.

Processor 330, which is coupled to PHY device 310, to MAC 320, to memory 340, and to network interface 350, may be any suitable one or more processors capable of executing scripts or instructions of one or more software programs stored in AP 300 (e.g., within memory 340). For purposes of discussion herein, MAC 320 is shown in FIG. 3 as being coupled between PHY device 310 and processor 330. For actual embodiments, PHY device 310, MAC 320, processor 330, memory 340, and/or network interface 350 may be connected together using one or more buses (not shown for simplicity).

The contention engines 321 may contend for access to the shared wireless medium, and may also store packets for transmission over the shared wireless medium. For some embodiments, AP 300 may include one or more contention engines 321 for each of a plurality of different access categories. For other embodiments, the contention engines 321 may be separate from MAC 320. For still other embodiments, the contention engines 321 may be implemented as one or more software modules (e.g., stored in memory 340 or within memory provided within MAC 320) containing instructions that, when executed by processor 330, perform the functions of contention engines 321.

The frame formatting circuitry 322 may be used to create and/or format frames received from processor 330 and/or memory 340 (e.g., by adding MAC headers to PDUs provided by processor 330), and may be used to re-format frames received from PHY device 310 (e.g., by stripping MAC headers from frames received from PHY device 310).

Memory 340 may include a STA profile data store 341 that stores profile information for a plurality of STAs. The profile information for a particular STA may include information including, for example, its MAC address, previous AP-initiated channel sounding requests, supported data rates, connection history with AP 300, and any other suitable information pertaining to or describing the operation of the STA.

Memory 340 may also include a non-transitory computer-readable medium (e.g., one or more nonvolatile memory elements, such as EPROM, EEPROM, Flash memory, a hard drive, and so on) that may store at least the following software (SW) modules:

a channel sounding request decoding software module 342 for decoding AP-initiated channel sounding requests received from non-associated STAs (e.g., as described for one or more operations of FIGS. 4A-4C, 5, and 7);

a channel sounding operation software module 343 for performing an AP-initiated channel sounding operation by announcing the channel sounding operation (e.g., using an NDPA) and sending one or more channel sounding patterns (e.g., NDPs) to the requesting STA (e.g., as described for one or more operations of FIGS. 4A-4C, 5, and 7);

a frame formatting and exchange software module 344 for creating one or more NDPAs, NDPs, probe responses, and/or action frames in response to the decoded AP-initiated channel sounding request, and/or for facilitating the creation and exchange of any suitable frames (e.g., probe responses, NDPs, NDPAs, data frames, ACK frames, management frames, action frames, control frames, association responses, beacon frames, and so on) between the AP 300 and other wireless devices (e.g., as described for one or more operations of FIGS. 4A-4C, 5, and 7);

a goodput determination software module 345 for determining a goodput value of AP 300 based, at least in part, on CSI feedback frames received from other wireless devices (e.g., as described for one or more operations of FIGS. 4A-4C, 5, and 7).

Each software module includes instructions that, when executed by processor 330, cause AP 300 to perform the corresponding functions. The non-transitory computer-readable medium of memory 340 thus includes instructions for performing all or a portion of the AP-side operations depicted in FIGS. 4A-4C, 5, and 7.

Processor 330, which is shown in the example of FIG. 3 as coupled to transceiver 311 of PHY device 310 via MAC 320, to memory 340, and to network interface 350, may be any suitable one or more processors capable of executing scripts or instructions of one or more software programs stored in AP 300 (e.g., within memory 340). For example, processor 330 may execute the channel sounding request decoding software module 342 to decode AP-initiated channel sounding requests received from non-associated STAs.

Processor 330 may execute the channel sounding operation software module 343 to perform an AP-initiated channel sounding operation, for example, by announcing the channel sounding operation (e.g., using an NDPA) and sending one or more channel sounding patterns (e.g., NDPs) to the requesting STA.

Processor 330 may execute the frame formatting and exchange software module 344 to create an NDPA and/or one or more NDPs in response to a received AP-initiated channel sounding request. As described in more detail below, the NDPs created by the frame formatting and exchange software module 344 may include an AID value set to zero (or other suitable value), for example, so that non-associated STAs may receive and process the NDPs transmitted by AP 300. Processor 330 may also execute the frame formatting and exchange software module 344 to facilitate the creation and exchange of various frames between the AP 300 and other wireless devices.

Processor 330 may execute the goodput determination software module 345 to determine the goodput value of AP 300 based, at least in part, on CSI received from other wireless devices. The CSI may be received from associated STAs and/or non-associated STAs in feedback frames.

As mentioned above, channel sounding operations may be used to measure the goodput of an AP. More specifically, the example embodiments may allow a STA to request one or more non-associated APs to initiate channel sounding operations with the STA. An AP-initiated sounding operation may be based on one or more NDPs sent from the AP to the STA (e.g., along the DL path between the AP and the STA); therefore, these AP-initiated sounding operations may be used to measure DL goodput values of the APs. This is in contrast to "reverse" channel sounding operations in which a STA sends one or more NDPs to an AP (e.g., along the uplink (UL) path between the STA and the AP) so that the UL goodput value of the AP may be measured.

Figure 4A:
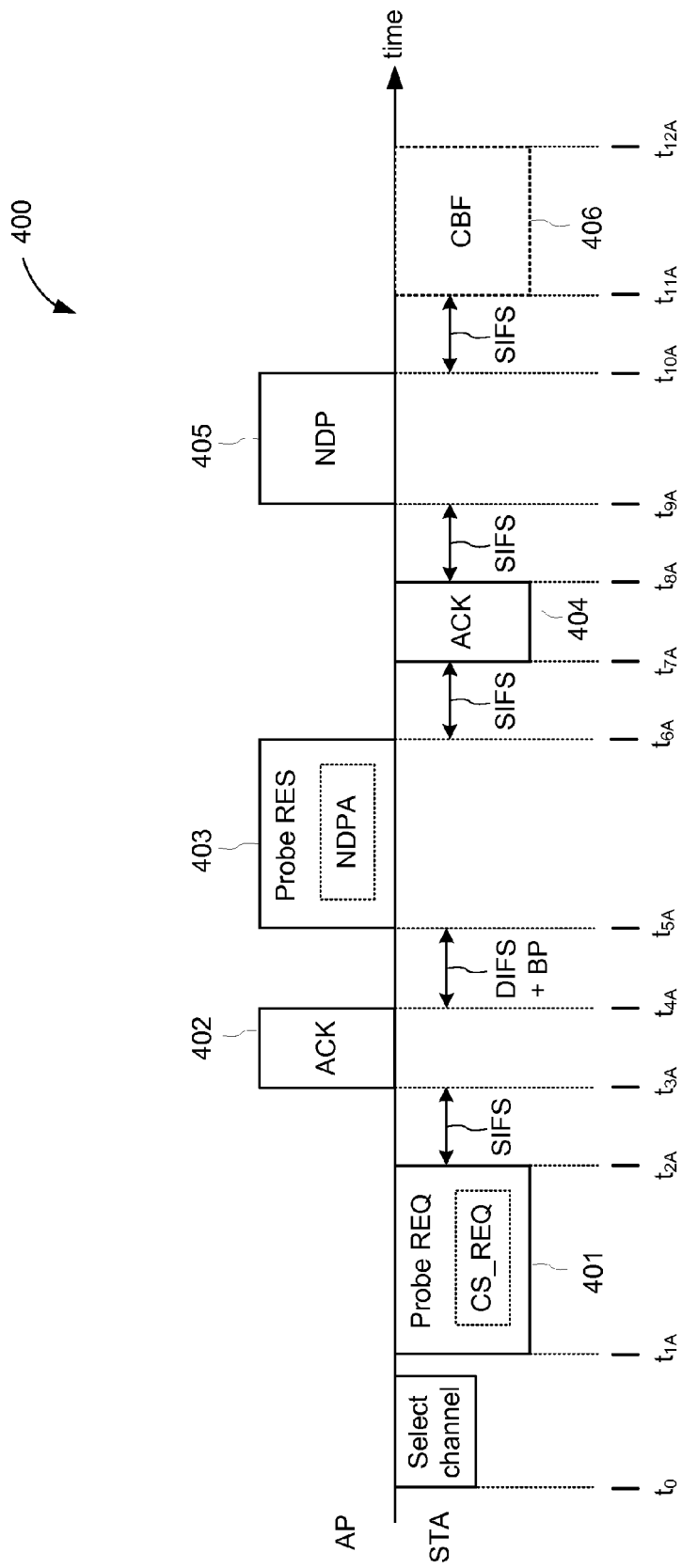
FIGS. 4A-4C show sequence diagrams depicting channel sounding operations between a STA and a non-PPDU in accordance with example embodiments.

FIG. 4A is a sequence diagram 400 depicting one example operation for a STA to measure the goodput value of a non-associated AP using an AP-initiated channel sounding operation. Although only one AP is depicted in FIG. 4A for simplicity, it is to be understood that the STA may request (and participate in) channel sounding operations to be initiated by any number of non-associated APs.

At time $t_0$, the STA may initiate an active scanning operation on a number of different frequency bands (e.g., channels) upon which one or more non-associated APs may be operating, and selects an initial channel for scanning. At time $t_{1A}$, the STA broadcasts a probe request 401 on the selected channel. Transmission of the probe request 401 may last until time $t_{2A}$.

In accordance with the example embodiments, the probe request 401 includes a request for one or more non-associated APs to initiate a channel sounding operation with the STA. The AP-initiated channel sounding request, denoted in FIG. 4A as CS_REQ, may cause each of a number of non-associated APs operating on the selected channel to initiate a channel sounding operation with the STA. The probe request 401 may include an SSID value set to zero, for example, so that all APs receiving the probe request 401 will respond to the STA.

The AP-initiated channel sounding request may be embedded within any suitable portion of the probe request 401, or may be appended to the probe request 401. For one example, the AP-initiated channel sounding request may be embedded in a vendor-specific information element (VSIE) contained within or appended to the probe request 401. For another example, the AP-initiated channel sounding request may be embedded in a number of reserved bits of a suitable field such as, for example, a legacy short training field (L-STF) and/or a legacy long training field (L-LTF), of the probe request 401.

The AP receives the probe request 401 broadcast from the STA, and after a Short Interframe Spacing (SIFS) duration, transmits an ACK frame 402 to the STA at time $t_{3A}$. Transmission of ACK frame 402 may last until time $t_{4A}$. The AP decodes the AP-initiated channel sounding request included within the probe request 401. In response thereto, the AP may then initiate a channel sounding operation with the STA.

More specifically, after a Distributed Interframe Spacing (DIFS) duration, the AP selects a random back-off period (BP) and contends for medium access. At time $t_{5A}$, the AP wins access to the wireless medium and transmits a probe response 403 to the STA. The probe response 403 may be a unicast frame having an AID value set to zero, for example, so that the STA may accept reception of the probe response 403 (otherwise, the STA may ignore the probe response 403 because the STA does not have an AID value assigned by the AP). In accordance with the example embodiments, the probe response 403 may include an NDPA informing the STA that the AP is to subsequently send one or more NDPs (or other suitable sounding information) to the STA.

The NDPA may be embedded within any suitable portion of the probe response 403, or may be appended to the probe response 403. For one example, the probe response 403 may include an information element (IE) that contains the NDPA (e.g., as discussed in more detail below with respect to FIGS. 6A-6B). For another example, the NDPA may be inserted into a reserved bit of a PHY header of the probe response 403 (e.g., as discussed in more detail below with respect to FIG. 6C). For another example, the probe response 403 may be a Very High Throughput (VHT) frame, and the NDPA may be included within a suitable VHT field of the PHY header of the VHT frame (e.g., as discussed in more detail below with respect to FIG. 6D). Transmission of the probe response 403 may last until time $t_{6A}$.

At time $t_{7A}$, which may be a SIFS duration after time $t_{6A}$, the STA may transmit an ACK frame 404 to the AP. The ACK frame 404 may inform the AP that the STA has received the NDPA and is ready for the requested sounding operation. Transmission of the ACK frame 404 may last until time $t_{8A}$.

At time $t_{9A}$, which may be a SIFS duration after time $t_{8A}$, the AP may transmit an NDP 405 to the STA. Transmission of the NDP 405 may last until time $t_{10A}$. The NDP 405 contains a predetermined pattern of information (e.g., a training sequence) that is known to the STA. For example, the NDP 405 may be a PPDU without a data field. Because the NDP 405 contains a predetermined pattern of information that is known to the STA, the STA may use the NDP 405 to estimate channel conditions of the DL channel between the AP and the STA.

Further, in accordance with the example embodiments, the STA may use the NDP 405 to estimate the DL goodput value of the AP. For example, the STA may determine the DL goodput value by calculating the amount of time required to transmit the NDP 405 (e.g., the NDP transmit time) over the wireless medium. Because the NDP 405 contains a known pattern of information, the goodput value may be calculated by dividing the size of the NDP 405 by the NDP transmit time.

At time $t_{11A}$, which may be a SIFS duration after time $t_{10A}$, the STA may optionally transmit a feedback frame 406 to the AP. The feedback frame 406, which may be a compressed beamforming feedback (CBF) frame, may include the estimated channel state information (CSI) and/or the calculated DL goodput value. Transmission of the feedback frame 406 may last until time $t_{12A}$.

Figure 4B:
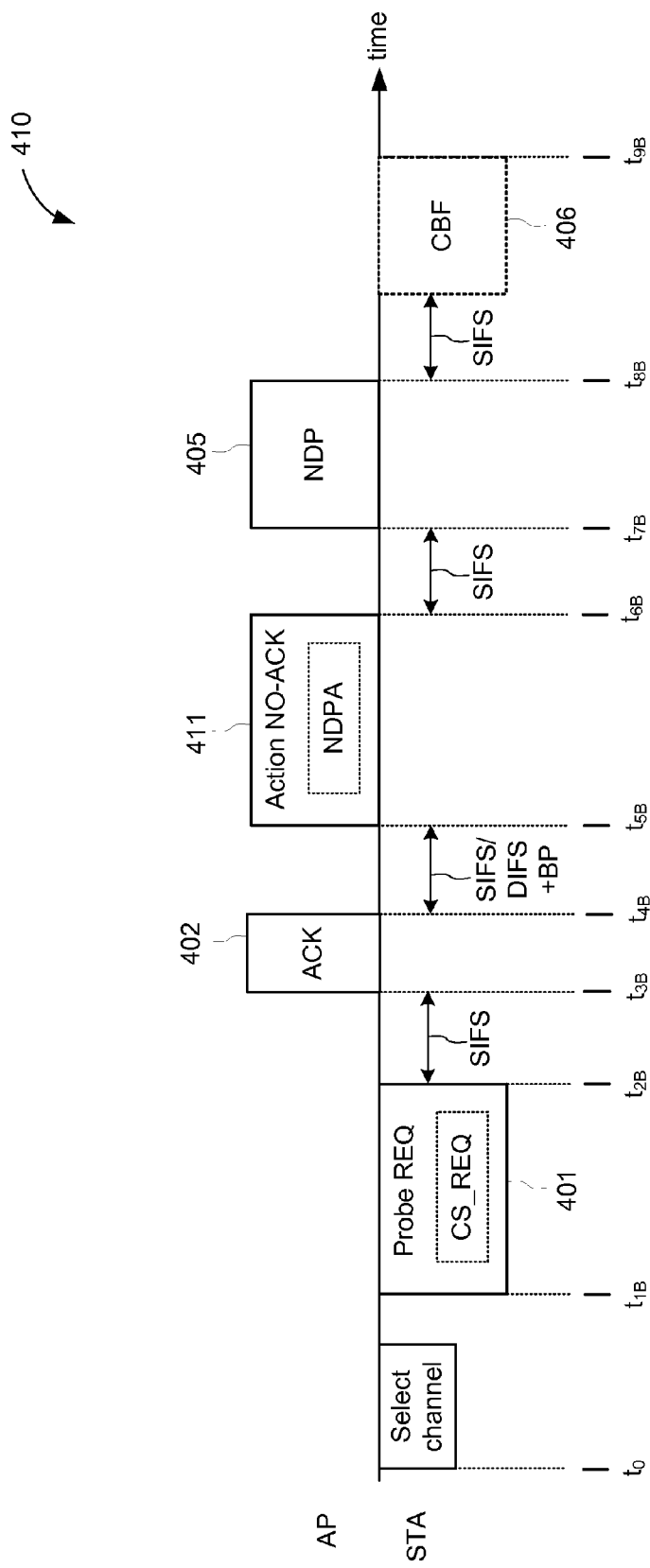

For another example embodiment, instead of sending the probe response 403 containing the NDPA (as depicted in FIG. 4A), the AP may send an action no-acknowledgment (NO-ACK) frame 411 containing the NDPA, for example, as depicted in the example sequence diagram 410 of FIG. 4B. At time $t_0$, the STA may initiate an active scanning operation on a number of different frequency bands (e.g., channels) upon which one or more non-associated APs may be operating, and selects an initial channel for scanning.

At time $t_{1B}$, the STA broadcasts a probe request 401 on the selected channel. Transmission of the probe request 401 may last until time $t_{2B}$. As described above, the probe request 401 includes a request for one or more non-associated APs to initiate a channel sounding operation with the STA. The AP-initiated channel sounding request, which may cause each of a number of non-associated APs operating on the selected channel to initiate a channel sounding operation with the STA, may be embedded within any suitable portion of the probe request 401, or may be appended to the probe request 401 (as discussed above).

The AP receives the probe request 401 broadcast from the STA, and after a SIFS duration, transmits an ACK frame 402 to the STA at time $t_{3B}$. Transmission of ACK frame 402 may last until time $t_{4B}$. The AP decodes the embedded AP-initiated channel sounding request. In response thereto, the AP may then initiate a channel sounding operation with the STA.

At time $t_{5B}$, which may be either a SIFS duration or a DIFS+BP duration after time $t_{4B}$, the AP may transmit the action NO-ACK frame 411 to the STA. The action NO-ACK frame 411 may include a NDPA informing the STA that the AP is to subsequently send one or more NDPs (or other suitable sounding information) to the STA. The action NO-ACK frame 411 does not require acknowledgement by the STA, and therefore the STA may not need to send an ACK frame to the AP. As a result, the AP may send the NDP 405 to the STA upon expiration of a SIFS duration after transmission of the action NO-ACK frame 411 (e.g., at time $t_{7B}$ in the sequence diagram 410 of FIG. 4B). In this manner, the AP-initiated channel sounding operation depicted in FIG. 4B may eliminate a SIFS duration and a transmit time of the ACK frame (e.g., as compared with the AP-initiated channel sounding operation depicted in FIG. 4A), thereby reducing the time required to perform the channel sounding operation.

Figure 4C:
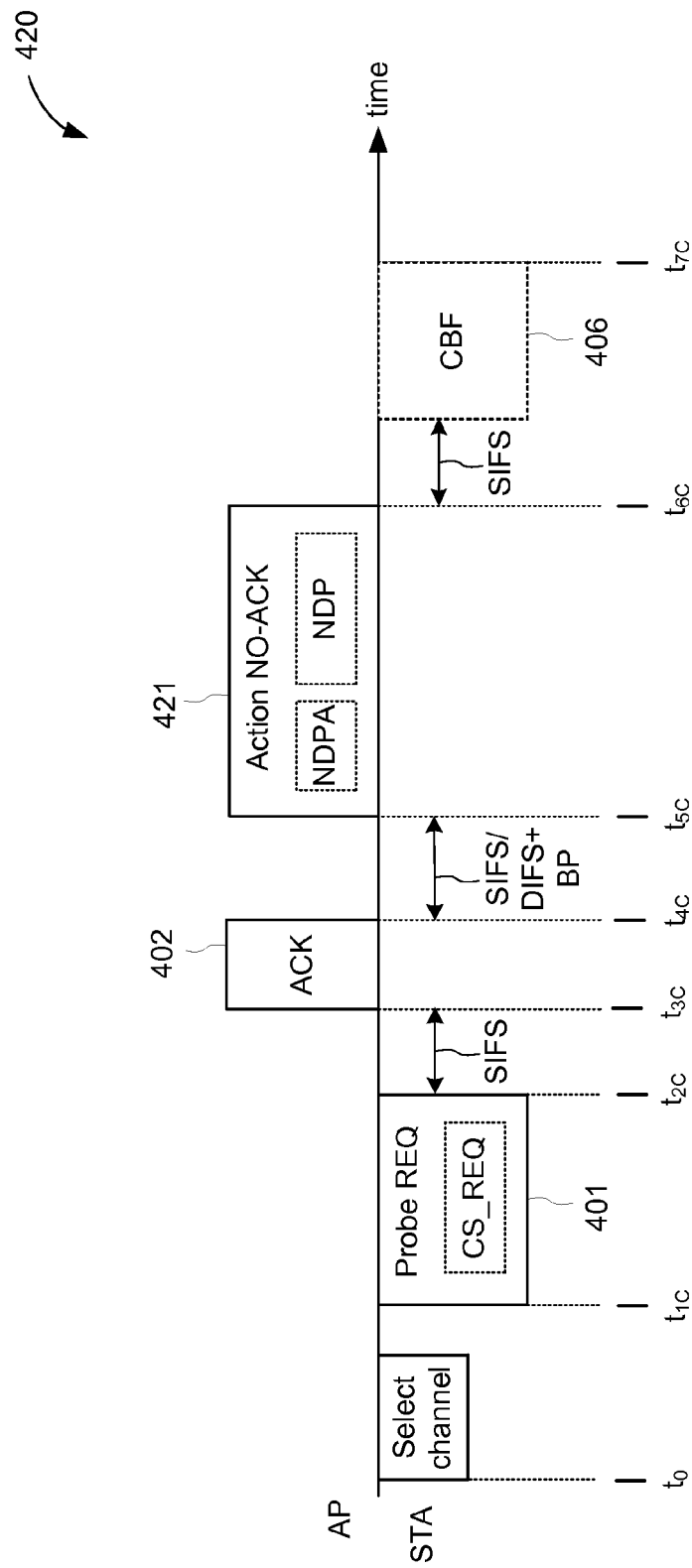

For yet another example embodiment, the AP may embed both the NDPA and the NDP in an action NO-ACK frame, for example, as depicted in the example sequence diagram 420 of FIG. 4C. At time $t_0$, the STA may initiate an active scanning operation on a number of different frequency bands (e.g., channels) upon which one or more non-associated APs may be operating, and selects an initial channel for scanning.

At time $t_{1C}$, the STA broadcasts a probe request 401 on the selected channel. Transmission of the probe request 401 may last until time $t_{2C}$. As described above, the probe request 401 includes a request for one or more non-associated APs to initiate a channel sounding operation with the STA. The AP-initiated channel sounding request, which may cause each of a number of non-associated APs operating on the selected channel to initiate a channel sounding operation with the STA, may be embedded within any suitable portion of the probe request 401, or may be appended to the probe request 401 (as discussed above).

The AP receives the probe request 401 broadcast from the STA, and after a SIFS duration, transmits an ACK frame 402 to the STA at time $t_{3C}$. Transmission of ACK frame 402 may last until time $t_{4C}$. The AP decodes the embedded AP-initiated channel sounding request. In response thereto, the AP may then initiate a channel sounding operation with the STA.

At time $t_{6C}$, which may be either a SIFS duration or a DIFS+BP duration after time $t_{4C}$, the AP may transmit an action NO-ACK frame 421 to the STA. Transmission of the action NO-ACK frame 421 may last until time $t_{6C}$. The action NO-ACK frame 421 may include both an NDPA that announces the channel sounding operation and one or more NDPs (or other suitable sounding information). The action NO-ACK frame 421 does not require acknowledgement by the STA, and therefore the STA may not need to send an ACK frame to the AP. By including both the NDPA and the NDP in the action NO-ACK frame 421, the AP may not need to send the NDPA and the NDP to the STA in separate frames (e.g., as compared to the sequence diagrams 400 and 410 of FIGS. 4A and 4B, respectively). In this manner, the AP-initiated channel sounding operation depicted in FIG. 4C may eliminate a number of SIFS durations and transmit times of the ACK frame and the NDP 405 (e.g., as compared with the AP-initiated channel sounding operation depicted in FIG. 4A), thereby reducing the time required to perform the channel sounding operation (and reducing the time associated with finding the best available AP with which to associate).

The NDPA and the NDP information may be embedded within any suitable portion of the action NO-ACK frame 421. For example, the NDPA may be embedded within staggered VHT fields of the preamble of the action NO-ACK frame 421, within the VHT-LTF of the preamble of the action NO-ACK frame 421, or may be appended to the end of the preamble of the action NO-ACK frame 421 (e.g., as described in more detail below with respect to FIG. 6). NDP information (e.g., the training sequence) may be embedded within one or more of the LTFs of the action NO-ACK frame 421, may be appended to the end of the preamble of the action NO-ACK frame 421, or may be inserted into the payload of the action NO-ACK frame 421 (e.g., as described in more detail below with respect to FIG. 6).

As mentioned above, the STA may request multiple non-associated APs to initiate channel sounding operations. To avoid collisions on the shared wireless medium, the STA may cause the multiple non-associated APs to send frames associated with the channel sounding operations in a staggered manner. More specifically, the probe request 401 broadcasted by the STA may include a schedule and/or other suitable information that indicates an order with which the non-associated APs are to send frames associated with the channel sounding operations to the STA. The schedule may be based on any suitable information that results in the non-associated APs sending sounding announcements and/or sounding packets in a sequential manner to the STA.

For at least one embodiment, the schedule may be based, at least in part, on identifiers (e.g., MAC addresses, SSID values, and so on) of the non-associated APs. For example, the STA may determine the MAC addresses and/or SSID values of the non-associated APs from beacon frames received from the non-associated APs, and then generate the schedule based, for example, according to increasing (or decreasing) numeric values of the MAC addresses or SSID values.

For at least another embodiment, the STA may derive the schedule based on timing information (e.g., timing synchronization function (TSF) values) of the non-associated APs. For example, the STA may determine TSF values of the non-associated APs from beacon frames received from the non-associated APs, and then generate the schedule by instructing each of the non-associated APs to send the NDPs at a corresponding different TSF value.

Figure 5:
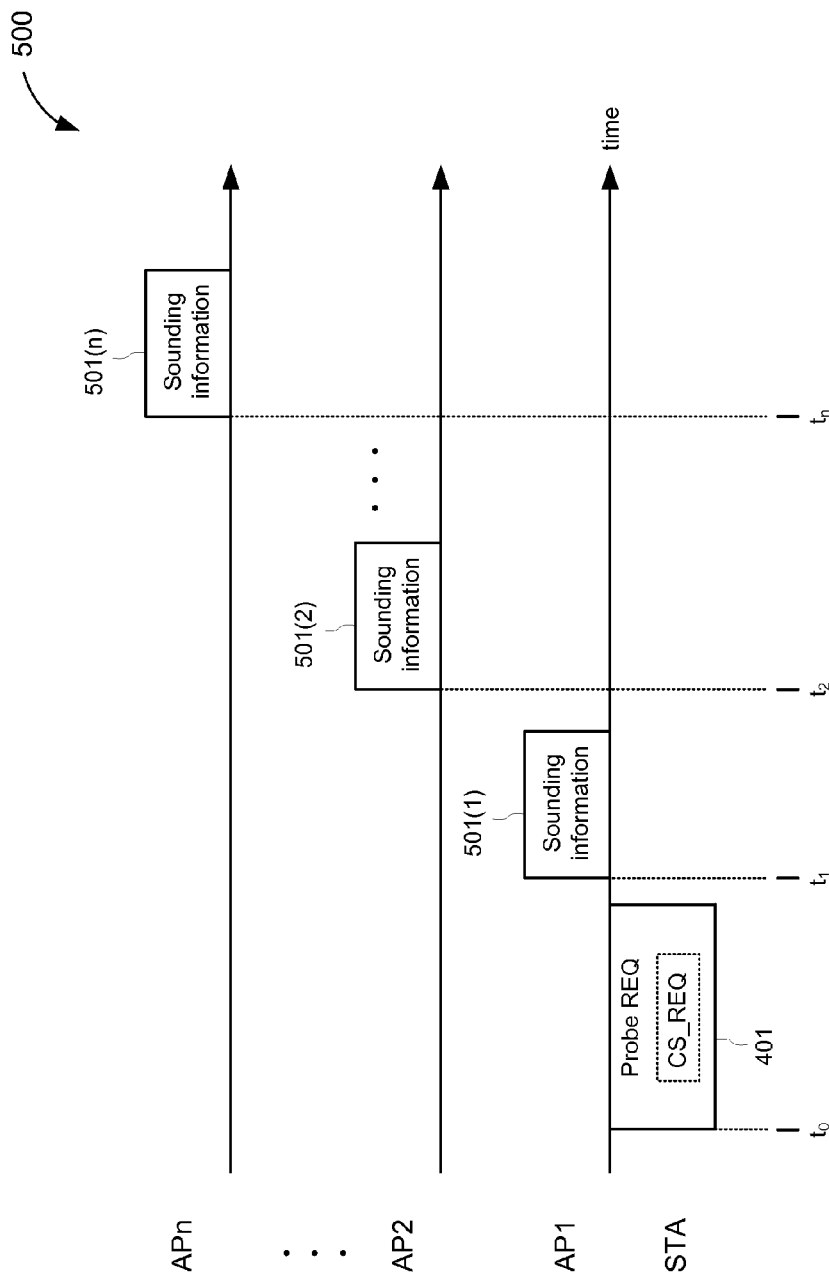
FIG. 5 shows a sequence diagram depicting channel sounding operations between a STA and multiple non-associated APs in accordance with example embodiments.

FIG. 5 shows a sequence diagram 500 depicting channel sounding operations between a STA and a plurality of non-associated access points AP1-APn in accordance with example embodiments. At time $t_0$, the STA broadcasts probe request 401 on the selected channel. The probe request 401 includes a request for the non-associated APs (AP1-APn) to initiate a channel sounding operation with the STA. The probe request 401 may also include a schedule that indicates an order in which AP1-APn send sounding information (e.g., NDPA and NDP information) to the STA. The schedule may be embedded within any suitable portion of the probe request 401, or may be appended to the probe request 401. For one example, the schedule may be embedded in a VSIE contained within or appended to the probe request 401. For another example, the schedule may be embedded in a number of reserved bits of a suitable field such as, for example, a legacy short training field (L-STF) or a legacy long training field (L-LTF), of the probe request 401.

In response to the received AP-initiated channel sounding request and the schedule, the access points AP1-APn send sounding information to the STA at different times (e.g., sequentially). More specifically, for the example of FIG. 5, AP1 sends sounding information 501(1) to the STA at time $t_1$. The STA receives the sounding information 501(1) from AP1, and may then determine a goodput value of AP1 based, at least in part, on the received sounding information 501(1). AP2 sends sounding information 501(2) to the STA at time $t_2$. The STA receives the sounding information 501(2) from AP2, and may then determine a goodput value of AP2 based, at least in part, on the received sounding information 501(2). APn sends sounding information 501(n) to the STA at time $t_n$. The STA receives the sounding information 501(n) from APn, and may then determine a goodput value of APn based, at least in part, on the received sounding information 501(n). The sounding information 501(1)-501(n) may be transmitted to the STA using any suitable one or more frames, for example, as described above with respect to the sequence diagrams 400, 410, and 420 of FIGS. 4A, 4B, and 4C, respectively.

Figure 6A:
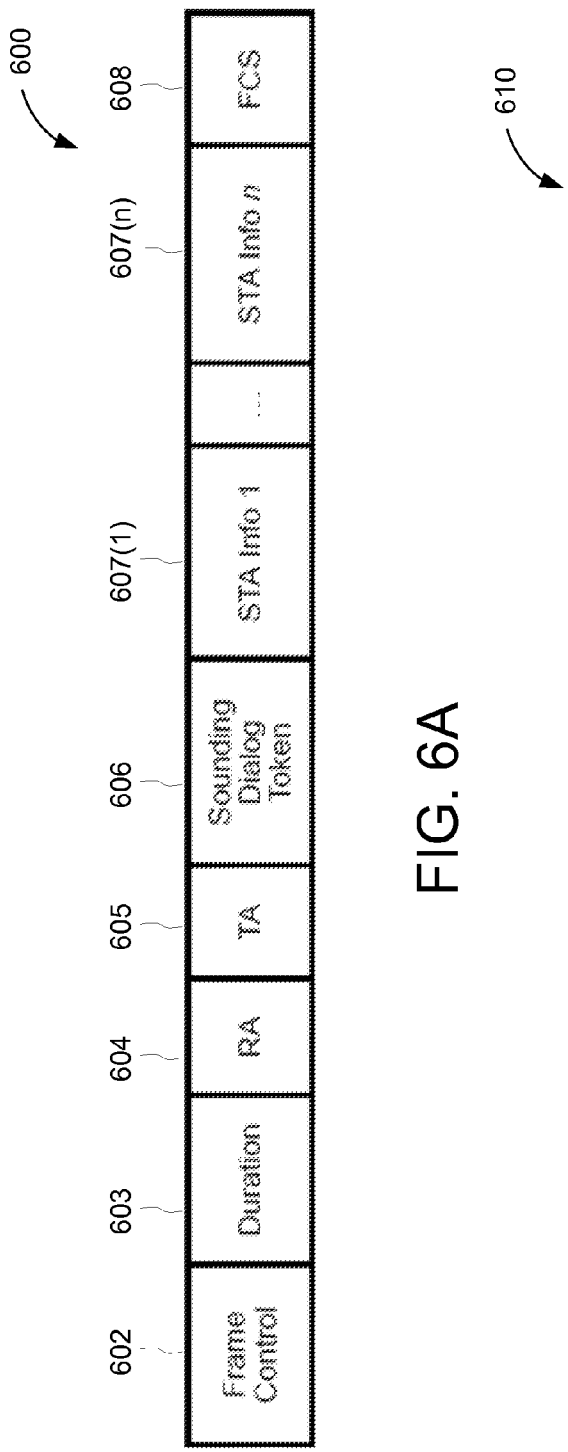
FIG. 6A-6D show example frames that may be used by the example embodiments.

FIG. 6A shows a VHT NDP Announcement frame 600 in accordance with the IEEE 802.11ac standards. The NDPA frame 600 includes a frame control field 602, a duration field 603, a receiver address (RA) field 604, a transmitter address (TA) field 605, a sounding dialog token field 606, a number of STA information fields 607(1)-607(n), and a frame control sequence (FCS) field 608. Each of the STA information fields 607(1)-607(n) may contain NPDA information for a corresponding STA.

For the implementation described above with respect to FIG. 4A (for which the NDPA is contained in the probe response 403), a STA information field 607 containing the NDPA information may be formed as an information element (IE) that is inserted into the frame body of the probe response 403.

For the implementation described above with respect to FIG. 4B (for which the NDPA is contained in Action NO-ACK frame 411), a STA information field 607 containing the NDPA information may be formed as an IE that is inserted into the frame body of Action NO-ACK frame 411.

For the implementation described above with respect to FIG. 4C (for which the NDPA and the NDP are contained in Action NO-ACK frame 421), a STA information field 607 containing the NDPA information may be formed as an IE that is inserted into the frame body of Action NO-ACK frame 421, and one or more very high throughput long training fields (VHT-LTFs) containing the NDP may be appended to the end of the Action NO-ACK frame 421. Appending the VHT-LTFs containing the NDP to the end of the Action NO-ACK frame 421 may be important, for example, so that the STA may "see" the NDPA (e.g., and thus may be ready to receive the NDP) before the STA decodes the appended NDP.

Figure 6B:
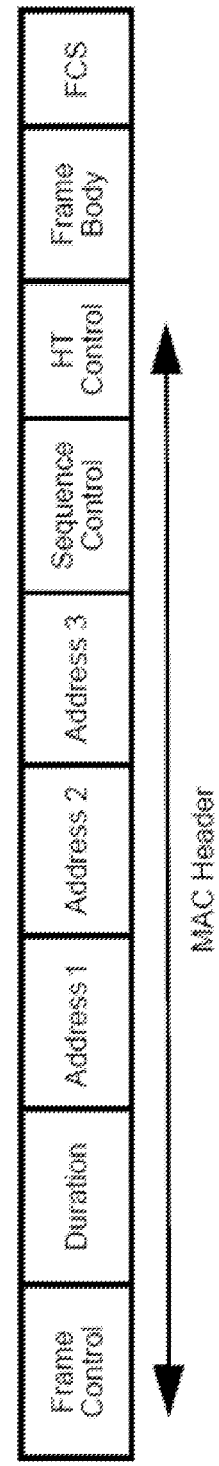

FIG. 6B shows a management frame 610 that may be used by the example embodiments. The management frame 610 may be used to form the probe response 403 of FIG. 4A, the action NO-ACK frame 411 of FIG. 4B, and/or the action NO-ACK frame 421 of FIG. 4C. For one example, when the management frame 610 is to be used as the probe response 403 of FIG. 4A, the Action NO-ACK frame 411 of FIG. 4B, and/or the Action NO-ACK frame 421 of FIG. 4C, the "address 1" field may contain the MAC address of the STA, the "address 2" field may contain the MAC address of the AP, and the "address 3" field may contain the BSSID of the corresponding WLAN. IE's containing the NDPA may be inserted into the frame body of management frame 610.

For other implementations, the NDPA may be inserted into the reserved bit in the preamble of the probe response (e.g., for implementations described above with respect to FIG. 4A) or into one or more reserved bits in the preamble of the Action NO-ACK frame (e.g., for implementations described above with respect to FIGS. 4B-4C). In addition, for the implementation described above with respect to FIG. 4C, the NDP may be inserted at the end of the preamble of the Action NO-ACK frame 421 (e.g., before the frame body).

Figure 6C:
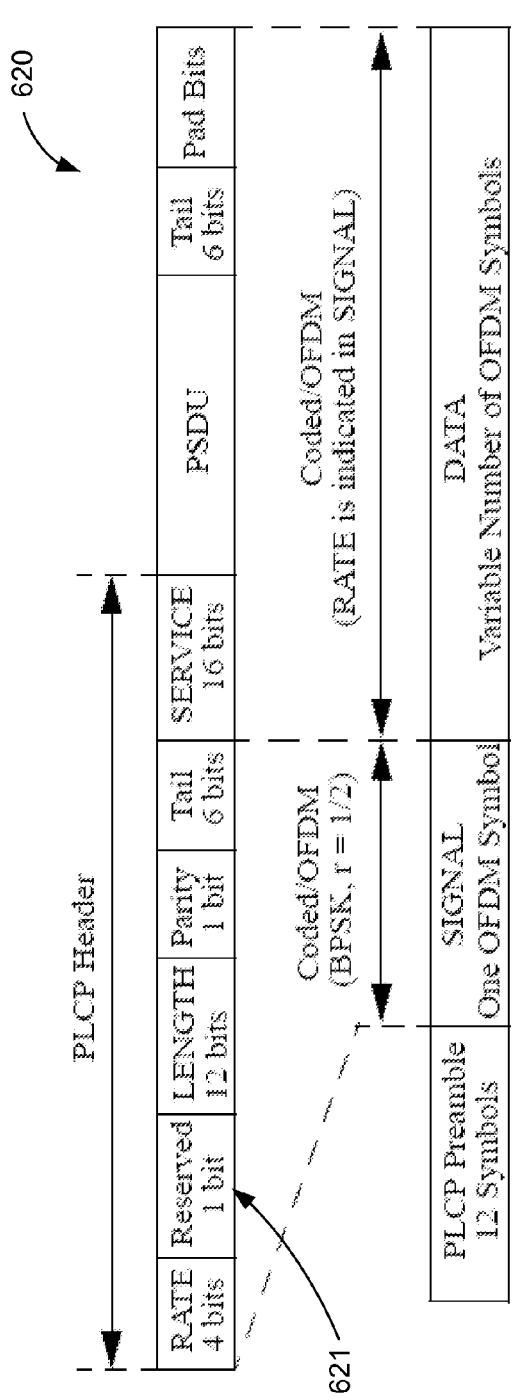

For example, FIG. 6C shows an OFDM frame 620 that may correspond to the probe response 403, the Action NO-ACK frame 411, and/or the Action NO-ACK frame 421. As described above, for other implementations, the NDPA may be inserted into the reserved bit 621 of the Physical Layer Convergence Protocol (PLOP) header of the OFDM frame 620. However, because there is only one reserved bit 621 in the PLOP header, which may already be used for another purpose, it may be desirable to use a VHT frame for probe response 403, the Action NO-ACK frame 411, and/or the Action NO-ACK frame 421.

Figure 6D:
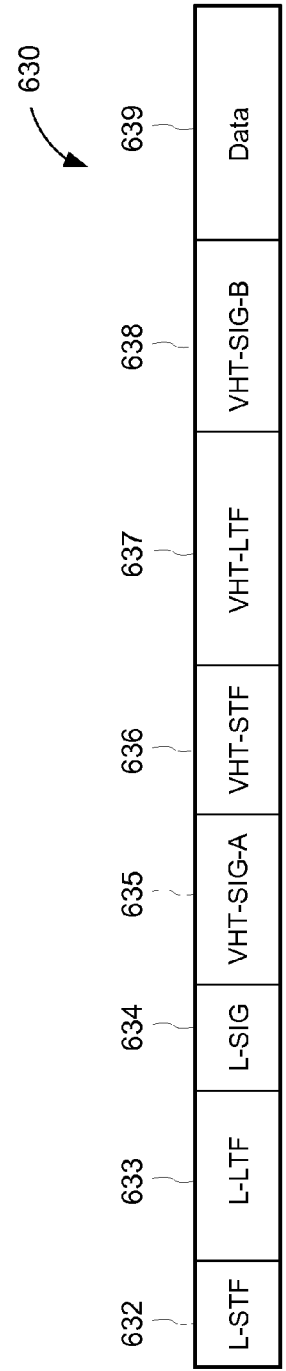

For example, FIG. 6D shows an example preamble 630 of a VHT frame. The preamble 630 may be the PHY header of the probe response 403 of FIG. 4A, the PHY header of the action NO-ACK frame 411 of FIG. 4B, and/or the PHY header of the action NO-ACK frame 421 of FIG. 4C. The preamble 630, which may be compliant with the IEEE 802.11ac standards, is shown to include an L-STF 632, an L-LTF 633, an L-SIG field 634, a VHT-SIG-A field 635, a VHT-STF 636, a VHT-LTF 637, a VHT-SIG-B field 638, and a data field 639. As discussed above with respect to FIGS. 4B-4C, the NDPA may be embedded within staggered VHT fields 635-638 of the preamble 630, within the VHT-LTF 637 of the preamble 630, or may be appended to the end of the preamble 630. NDP information (e.g., the training sequence) may be appended to the end of the preamble 630, or may be inserted into the data field 639 of the preamble 630.

Figure 7:
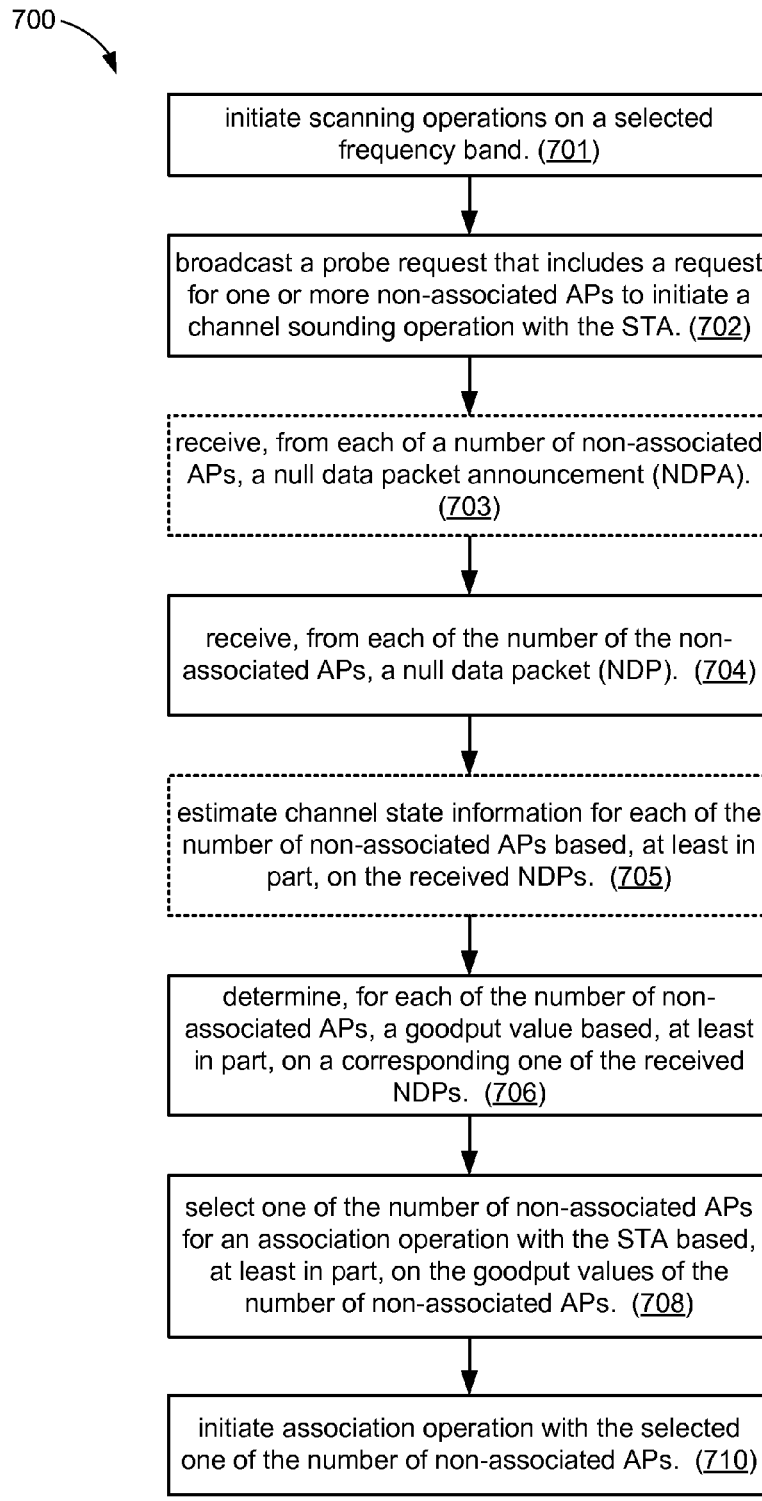
FIG. 7 shows an illustrative flow chart depicting an example operation for selecting one of a number of non-associated APs with which the STA of FIG. 2 may associate.

An example operation of STA 200 selecting an access point (AP) with which to associate is described below with respect to the illustrative flow chart 700 of FIG. 7. Referring also to FIGS. 2, 3, and 4A-4C, the STA 200 may first initiate scanning operations on each of a number of different frequency bands or channels (701). Then, for each frequency band, STA 200 may perform the following operations. First, STA 200 may broadcast a probe request that includes a request for one or more non-associated APs to initiate a channel sounding operation with the STA (702). A number of the non-associated APs receive the probe request, decode the embedded AP-initiated channel sounding request, and then initiate a channel sounding operation with the STA 200.

The STA 200 may receive, from each of the number of non-associated APs, a null data packet announcement (NDPA) (703). Each of the NDPAs may inform the STA 200 that a corresponding one of the non-associated APs is to subsequently send one or more NDPs (or other suitable sounding information) to the STA 200. As described above, the NDPAs may be sent to the STA in probe responses, in action NO-ACK frames, or in any other suitable frames.

The STA 200 may receive, from each of the number of the non-associated APs, a null data packet (NDP) frame (704). As described above, the NDPs contain a predetermined pattern of information (e.g., a training sequence) that is known to the STA 200, thereby allowing the STA 200 to estimate channel conditions and/or determine goodput values for the non-associated APs. As described above, the NDP may be transmitted to the STA 200 in various manners including, for example, as an NDP, within an action NO-ACK frame, or in any other suitable frames.

The STA 200 may optionally estimate channel state information (CSI) for each of the number of non-associated APs based, at least in part, on the received NDPs (705). The STA 200 may send the estimated CSI to the non-associated APs in one or more feedback frames (e.g., CBF frames). For other embodiments, STA 200 may not estimate CSI for the non-associated APs.

The STA 200 may then determine, for each of the number of non-associated APs, a goodput value based, at least in part, on a corresponding one of the received NDPs (706).

The STA 200 may then select one of the number of non-associated APs for an association operation with the STA 200 based, at least in part, on the goodput values of the number of non-associated APs (708). For example, the STA 200 may select the non-associated AP having the greatest goodput value for the association operation.

Thereafter, STA 200 may initiate an association operation with the selected one of the number of non-associated APs (710). The association operation may involve the exchange of information about the capabilities of the selected AP and STA 200. For example, after selecting the "best" non-associated AP with which to associate, STA 200 may send an association request to the selected AP. The association request may include information such as, for example, the SSID and supported data rates of STA 200. The selected AP may respond by sending an association response to STA 200. The association response may include information such as, for example, the AID value assigned to STA 200. Once the association operation is complete, STA 200 and the selected AP may send data frames to each other.

In this manner, a STA seeking to initiate an association operation with one of a number of non-associated APs may use channel sounding operations to determine (or at least estimate) the goodput values of the non-associated APs without having to first associate with the APs (which reduces the time required to select one of the non-associated APs for association). Because goodput values may consider channel conditions, MIMO effects, multipath effects, and other interference, selecting one of the non-associated APs for association based on goodput values may provide the STA with a more accurate estimate of the effective data rates of the non-associated APs than RSSI values.

Referring again to FIG. 1A, the goodput values of the non-associated APs 110A-110E, whether determined by the STA and provided to the non-associated APs 110A-110E in feedback frames or determined by the non-associated APs 110A-110E, may be used to assist the STA 200 in its selection of with which of the non-associated APs 110A-110E to associate. For example, the goodput values of the non-associated APs 110A-110E may be provided to (or determined by) the WLAN server 130. The WLAN server 130 may assess the load (e.g., medium utilization) of each of the non-associated APs 110A-110E using known techniques. The WLAN server 130 may then use the goodput values of the non-associated APs 110A-110E, along with the determined loads of the non-associated APs 110A-110E, to suggest one of the non-associated APs 110A-110E to the STA 200 for association. In this manner, the WLAN server 130 may achieve load balancing between the APs 110A-110E of the WLAN 120.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, the example embodiments have been described with reference to specific example embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method performed by a mobile station (STA) for selecting an access point (AP) with which to associate, the method comprising:
   broadcasting a probe request that includes a request for one or more non-associated APs to initiate a channel sounding operation with the STA;
   receiving, from each of a number of the non-associated APs, a null data packet (NDP), wherein the probe request includes a schedule indicating an order in which the number of non-associated APs are to send the NDPs to the STA;
   determining, for each of the number of non-associated APs, a goodput value based, at least in part, on a corresponding one of the received NDPs; and
   selecting one of the number of non-associated APs for an association operation with the STA based, at least in part, on the determined goodput values of the number of non-associated APs.

2. The method of claim 1, wherein the NDP is embedded within an action no-acknowledgement (NO-ACK) frame.

3. The method of claim 1, further comprising:
   receiving, from each of the number of non-associated APs, a null data packet announcement (NDPA) indicating that the corresponding non-associated AP is to send one or more NDPs to the STA.

4. The method of claim 3, wherein the NDPA includes an association identification (AID) value set to 0.

5. The method of claim 3, wherein the NDPA is embedded within a probe response.

6. The method of claim 3, wherein the NDPA is embedded within an action no-acknowledgement (NO-ACK) frame.

7. The method of claim 1, further comprising:
   estimating channel state information for at least one of the non-associated APs based, at least in part, on the received NDPs; and
   sending the estimated channel state information to the at least one non-associated AP.

8. The method of claim 1, wherein the number of non-associated APs includes at least a first non-associated AP and a second non-associated AP, wherein the selecting comprises:
   comparing the goodput value of the first non-associated AP with the goodput value of the second non-associated AP;
   selecting the first non-associated AP for the association operation if the goodput value of the first non-associated AP is greater than the goodput value of the second non-associated AP; and
   selecting the second non-associated AP for the association operation if the goodput value of the second non-associated AP is greater than the goodput value of the first non-associated AP.

9. A mobile station (STA) configured to select an access point (AP) with which to associate, the STA comprising:
   a transceiver to exchange wireless signals with one or more APs;
   one or more processors; and
   a memory storing instructions that, when executed by the one or more processors, cause the STA to:
      broadcast a probe request that includes a request for one or more non-associated APs to initiate a channel sounding operation with the STA;
      receive, from each of a number of the non-associated APs, a null data packet (NDP), wherein the probe request includes a schedule indicating an order in which the number of non-associated APs are to send the NDPs to the STA;
      determine, for each of the number of non-associated APs, a goodput value based, at least in part, on a corresponding one of the received NDPs; and
      select one of the number of non-associated APs for an association operation with the STA based, at least in part, on the determined goodput values of the number of non-associated APs.

10. The mobile station of claim 9, wherein the NDP is embedded within an action no-acknowledgement (NO-ACK) frame.

11. The mobile station of claim 9, wherein execution of the instructions causes the STA to further:
    receive, from each of the number of non-associated APs, a null data packet announcement (NDPA) indicating that the corresponding non-associated AP is to send one or more NDPs to the STA.

12. The mobile station of claim 11, wherein the NDPA includes an association identification (AID) value set to 0.

13. The mobile station of claim 11, wherein the NDPA is embedded within a probe response.

14. The mobile station of claim 11, wherein the NDPA is embedded within an action no-acknowledgement (NO-ACK) frame.

15. The mobile station of claim 9, wherein execution of the instructions causes the STA to further:
    estimate channel state information for at least one of the non-associated APs based, at least in part, on the received NDPs; and
    send the estimated channel state information to the at least one non-associated AP.

16. The mobile station of claim 9, wherein the number of non-associated APs includes at least a first non-associated AP and a second non-associated AP, wherein execution of the instructions to select one of the number of non-associated APs for the association operation causes the STA to:
    compare the goodput value of the first non-associated AP with the goodput value of the second non-associated AP;
    select the first non-associated AP for the association operation if the goodput value of the first non-associated AP is greater than the goodput value of the second non-associated AP; and
    select the second non-associated AP for the association operation if the goodput value of the second non-associated AP is greater than the goodput value of the first non-associated AP.

17. A non-transitory computer-readable medium storing instructions that, when executed by one or more processors of a mobile station (STA), cause the STA to select an access point (AP) with which to associate by performing operations comprising:
    broadcasting a probe request that includes a request for one or more non-associated APs to initiate a channel sounding operation with the STA;
    receiving, from each of a number of the non-associated APs, a null data packet (NDP) wherein the probe request includes a schedule indicating an order in which the number of non-associated APs are to send the NDPs to the STA;
    determining, for each of the number of non-associated APs, a goodput value based, at least in part, on a corresponding one of the received NDPs; and selecting one of the number of non-associated APs for an association operation with the STA based, at least in part, on the determined goodput values of the number of non-associated APs.

18. The non-transitory computer-readable medium of claim 17, wherein the NDP is embedded within an action no-acknowledgement (NO-ACK) frame.

19. The non-transitory computer-readable medium of claim 17, wherein execution of the instructions causes the STA to perform operations further comprising:
receiving, from each of the number of non-associated APs, a null data packet announcement (NDPA) indicating that the corresponding non-associated AP is to send one or more NDPs to the STA.

20. The non-transitory computer-readable medium of claim 19, wherein the NDPA includes an association identification (AID) value set to 0.

21. The non-transitory computer-readable medium of claim 19, wherein the NDPA is embedded within a probe response.

22. The non-transitory computer-readable medium of claim 19, wherein the NDPA is embedded within an action no-acknowledgement (NO-ACK) frame.

23. The non-transitory computer-readable medium of claim 17, wherein execution of the instructions causes the STA to perform operations further comprising:
estimating channel state information for at least one of the non-associated APs based, at least in part, on the received NDPs; and
sending the estimated channel state information to the at least one non-associated AP.

24. The non-transitory computer-readable medium of claim 17, wherein the number of non-associated APs includes at least a first non-associated AP and a second non-associated AP, wherein execution of the instructions to select one of the number of non-associated APs for the association operation causes the STA to perform operations further comprising:
comparing the goodput value of the first non-associated AP with the goodput value of the second non-associated AP;
selecting the first non-associated AP for the association operation if the goodput value of the first non-associated AP is greater than the goodput value of the second non-associated AP; and
selecting the second non-associated AP for the association operation if the goodput value of the second non-associated AP is greater than the goodput value of the first non-associated AP.

25. A mobile station (STA) configured to select an access point (AP) with which to associate, the STA comprising:
means for broadcasting a probe request that includes a request for one or more non-associated APs to initiate a channel sounding operation with the STA;
means for receiving, from each of a number of the non-associated APs, a null data packet (NDP), wherein the probe request includes a schedule indicating an order in which the number of non-associated APs are to send the NDPs to the STA;
means for determining, for each of the number of non-associated APs, a goodput value based, at least in part, on a corresponding one of the received NDPs; and
means for selecting one of the number of non-associated APs for an association operation with the STA based, at least in part, on the determined goodput values of the number of non-associated APs.

26. The mobile station of claim 25, wherein the NDP is embedded within an action no-acknowledgement (NO-ACK) frame.

27. The mobile station of claim 26, further comprising:
means for receiving, from each of the number of non-associated APs, a null data packet announcement (NDPA), wherein the NDPA is embedded in the action NO-ACK frame.

* * * * *